A. G. BABCOCK.
Corn-Planter.
No. 21,404. Patented Sept 7, 1858.
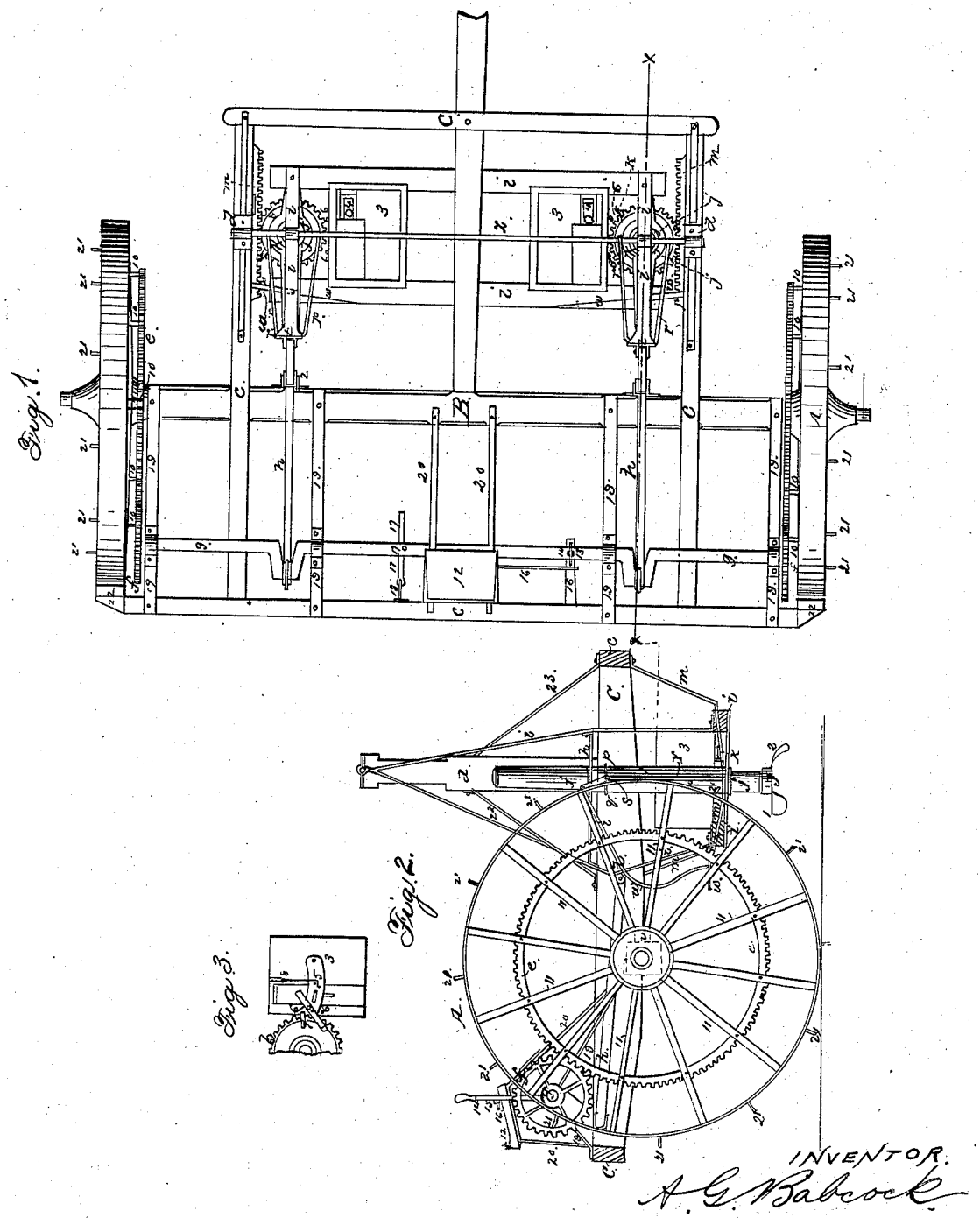
INVENTOR.
A. G. Babcock

UNITED STATES PATENT OFFICE.

A. G. BABCOCK, OF GALESBURG, ILLINOIS.

IMPROVEMENT IN CORN-PLANTERS.

Specification forming part of Letters Patent No. 21,404, dated September 7, 1858.

*To all whom it may concern:*

Be it known that I, A. G. BABCOCK, of Galesburg, in the county of Knox and State of Illinois, have invented a new and useful Machine for Planting Corn; and I do hereby declare that the following is a full, clear, and exact description of the construction and operation of the same, reference being had to the annexed drawings, making a part of this specification, in which—

Figure 1 is a perspective view of the upper side; Fig. 2, a perspective view through the end and section through the line $x\ x$; Fig. 3, the hopper and apparatus inverted.

The nature of my invention consists in the arrangement of a carriage with two wheels, axletree, and body-frame, with an upright standard on each side of the frame, near the front. Across from the top of the standards is a rocking shaft or rod, to which is attached a swinging or vibrating frame. On the inside of each carriage-wheel is attached a gearing of a given diameter. Connected with these are two other cog-wheels of one-third their diameter, attached to a crank-shaft extending across the carriage, near the back part. Attached to the cranks are pitmen extending forward and connected with the vibrating or swinging frame, so that by a revolution of the carriage-wheels the swinging frame is made to vibrate back and forth three times. Fixed to the swinging frame are two double tubes, or a tube within a tube, in an upright position, the outer one being fixed by bearings at each end. Near the bottom of each outer tube is a cog-wheel geared into a stationary rack, so that when the swinging carriage vibrates back and forth the tubes are made to revolve. In the outer tubes and on opposite sides are slots through which the inner tubes are connected to flanges which move up and down outside of the outer tubes by bolts which cause the inner tubes to revolve with the outer ones. Below the flange is a ring with shanks extending on each side, to which are attached levers or arms by couplings, for the purpose of raising the inner tubes. The lifting levers or arms are attached to the swinging frame by bearings, at which point is attached a shank which, when the swinging carriage is carried back, is brought in contact with a roller, carrying it downward and forward, when it is caught and held by a catch and spring, by which motion the inner tubes are raised and held suspended. From the catch extends a shank at right angles over the stationary rack, on which is placed a stop, so that when the swinging carriage is thrown forward the shank of the catch comes in contact with the stop, disengaging the shanks of the lifting-levers, allowing the inner tubes to drop. The inner tubes extend below the outer ones sufficiently far to attach the planters, to which they are made fast by a set-screw, or otherwise.

The planter is formed by a ring with two shanks extending in opposite directions from the center, to which are attached blades diagonally, so that as the planter revolves one turns a furrow from and the other toward the center. The planters are so arranged on the inner tubes that when they have performed one-fourth of a revolution the corn is dropped directly into the furrow opened by the blade turning its furrow out, and continuing its rotation, the other blade, turning its furrow in, covers the corn. Near the bottom of the swinging frame and attached to it are two hoppers, in which are slides or valves moved by a lever upon the under side of the hopper. The levers are attached to the slides or valves by screws traveling in slots in the bottom of the hoppers. At the end of each lever are two shanks or points extending downward, by which they are moved backward and forward by a tongue or projecting point on the under side of the cog-wheel attached to the outer tube. When the lever is moved past the center by the tongue or point it is thrown still farther and out of the way by a spring passing over a pin. From the bottom of the hopper extends a tube through which the corn is directed to its exact destination in the hill. The valve or slide is made with an opening or hole to receive the corn when thrown out, with a depression between the hole and the end of the slide of sufficient size to admit of the escape of corn which is not required for the hill without cutting or bruising. When the swinging carriage is thrown forward, and immediately before the planters drop to the ground, the slides are moved forward to receive the corn, the carriage starts back, revolving the planters one-fourth of a revolution, the slides are thrown back, discharging the corn through an opening and the tube in the bottom of the hopper into the hill. When the carriage has traveled back sufficiently far to plant the corn the planters are raised from the ground and carried forward again to the exact point for planting the next hills. The forward motion of the main carriage and the back motion of the swinging carriage are exactly the same while the planters rest upon the ground, causing them to remain on the same spot during the planting process. The gearing upon the main or carriage wheels is attached by shanks to the spokes, carrying it to such a distance within the rim of the wheels as not to be liable to be clogged by substances falling from them, and to admit of throwing the crank-shaft out of gear. Upon the crank-shaft, and near the right of the driver's seat, is a flange on the shaft, with a lever and attachment for moving the crank-shaft and the cog-wheels attached to it to the right for the purpose of throwing it out of gear, and by the opposite motion it is thrown into gear. From the driver's seat extends a spring to the lever, passing over a pin in the lever, which holds the shaft stationary, whether in or out of gear. At the left of the driver's seat are three arms, attached to the crank-shaft, for the purpose of rotating the shaft by hand when out of gear, to set or regulate the planters to correspond exactly with rows or hills alread planted, and by fastening with a hasp the swinging carriage is held perfectly stationary while the main carriage is in motion, the machine being out of gear.

In order to enable others skilled in the art to make and use my invention, I will proceed to describe the same with reference to the drawings.

Fig. 1, A A represent the carriage-wheels; B, the axle-tree; C C C C, the body-frame; $d\ d$, the upright standards. On each carriage-wheel A is a gearing, $e$, of a given diameter. Connected with these are two other cog-wheels, $ff$, of one-third their diameter, attached to a crank-shaft, $g$, extending across the carriage and near the back part. Connected with the crank-shaft $g$ are two pitmen, $h\ h$, extending forward and connecting with the swinging frame $i\ i\ i\ i\ i$, which is supported by the rod $z$, resting upon the standards $d\ d$, so that by one revolution of the carriage-wheels A A the swinging carriage $i\ i\ i\ i\ i$ is made to travel back and forth three times.

Attached to the swinging frame are two double tubes, $j\ j$, in an upright position, one moving within the other, the outer one being fixed by bearings $k\ k$ at each end. Near the bottom of each outer tube is a cog-wheel, $l\ l$, Fig. 1, geared into a stationary rack, $m\ m$, which is attached to the main carriage by shanks, so that when the swinging carriage vibrates back and forth the tubes $j\ j$ are made to revolve.

In the outer tubes, $n$, Fig. 2, and on opposite sides, are slots $o$, Fig. 2, through which the inner tubes are connected to flanges $p$, Fig. 2, which move up and down outside of the outer tubes, $n$, Fig. 2, by bolts, which cause the inner tubes, $j\ j$, to revolve with the outer ones. Below the flange is a ring, $q$, Fig. 2, with shanks, Fig. 2, to which are attached levers or arms $r\ r\ r\ r$ by couplings $s$, Fig. 2. For the purpose of raising the inner tubes, $j\ j$, the levers $r\ r$ are attached to the swinging frame by bearings at $t\ t$, at which point is attached a shank, $u$, Fig. 2, which, when the swinging carriage is carried back, is brought in contact with rollers $v\ v$, carrying it downward and forward, when it is caught and held by a catch, $w$, and spring, $w'$, by which motion the inner tubes, $j\ j$, are raised and held suspended. From the catch $w$ extends a shank at right angles with the catch, extending over the stationary rack $m$, on which is placed a stop, $x$, so that when the swinging frame is thrown forward the shank of the catch $w$ comes in contact with the stop $x$, disengaging the shank of the arms or levers $r\ r$, allowing the inner tubes, $j\ j$, to drop. The inner tubes, $j\ j$, extend below the outer ones, $n\ n$, sufficiently far to attach the planter $y$, to which it is made fast by a set-screw, or otherwise.

The planter $y$ is formed by a ring with two shanks extending in opposite directions from the center, to which are attached blades 1 2 diagonally, so that as the planter $y$ revolves, 1, Fig. 1, turns a furrow from and the other, 2, toward the center. The planters $y\ y$ are so arranged on the inner tubes, $j\ j$, that when they have performed one-fourth of a revolution the corn is dropped directly into the furrow opened by the blade 1, which turns its furrow out, and, continuing its rotation, the other blade, 2, turning its furrow in, covers the corn.

Near the bottom of the swinging frame, and attached to it, are two hoppers, 3 3, in which are slides or valves 4, moved by a lever, 5, Fig. 3, upon the under side of the hopper 3. The lever 5, Fig. 3, is attached to the slide or valve 4 by a screw traveling in a slot in the bottom of the hopper. At the end of the lever 5, Fig. 3, are two shanks or points, 6, extending downward, by which it is moved backward and forward by a tongue or projecting point fixed upon the under side of the cog-wheel $l$, attached to the outer tube, $n$. When the lever 5, Fig. 3, is moved past the center by the tongue or projecting point 7 it is thrown still farther and out of the way by a spring, 8, Fig. 3, passing over a pin, Fig. 3. From the bottom of the hopper extends a tube, 9, Fig. 3, through which the corn is directed to its exact destination in the hill.

The valve or slide 4 is made with an opening or hole to receive the corn when thrown out, with a depression between the hole and the end of the slide 4 of sufficient size to admit of the escape of corn which is not required for the hill without cutting or bruising. When the swinging carriage is thrown forward, and immediately before the planters $y$ drop to the ground, the slides 4 are thrown forward to receive the corn, the carriage starts back, revolving the planters $y\ y$ one-fourth of a revolution, the slides 4 are thrown back, discharging the corn through the hole and tube at the bottom of the hopper. When the swinging carriage has traveled back sufficiently far to plant the corn the planters y y are raised from the ground and carried forward again to the exact point for planting the next hills. The forward motion of the main carriage and the back motion of the swinging carriage are exactly the same while the planters y y are resting on the ground, causing them to remain on the same spot during the planting process.

The gearing e e on the main wheels A A is attached by shanks 10 to the spokes 11, carrying it to such a distance within the rim of the wheels as to not be liable to be clogged by substances falling from them, and to admit of throwing the crank-shaft g out of gear.

Upon the crank-shaft, and near the right of the driver's seat 12, is a flange, 13, with a lever and attachment, 14, for moving the crank-shaft g and the cog-wheels attached to it, f f, to the right, for the purpose of throwing it out of gear, and by the opposite motion it is thrown into gear. From the driver's seat 12 extends a spring, 15, to the lever 14, passing over a pin, 16, in the lever 14, which holds the shaft g stationary, whether in or out of gear.

At the left of the driver's seat 12 are three arms, 17, attached to the shaft g, for the purpose of rotating the shaft by hand when out of gear, to set or regulate the planters to correspond exactly with rows or hills already planted, and by fastening with a hasp, 18, the swinging carriage is held perfectly stationary while the main carriage is in motion, the machine being out of gear. The crank-shaft g is supported by bearings 19, extending from the back of frame to the axle-tree B. Upon the outer edge of the carriage-wheels A A are attached lags 21, for the purpose of preventing the wheels from slipping. Upon the under side of the back timber of the body-carriage are fixed scrapers 22, which extend across the surface of the wheels A A, for the purpose of keeping them clean and preserving their exact diameter. Braces 23 are to support the standards d d. The seat 12 is supported by braces 20.

Having thus fully described my invention, what I claim therein as new, and desire to secure by Letters Patent, is—

The arrangement and combination of the entire machine for the purpose of planting corn.

A. G. BABCOCK.

Witnesses:
ASAPH N. CARPENTER,
LEO G. BABCOCK.